J. R. JOHNS.
CAR-STARTER.
No. 192,375.  Patented June 26, 1877.
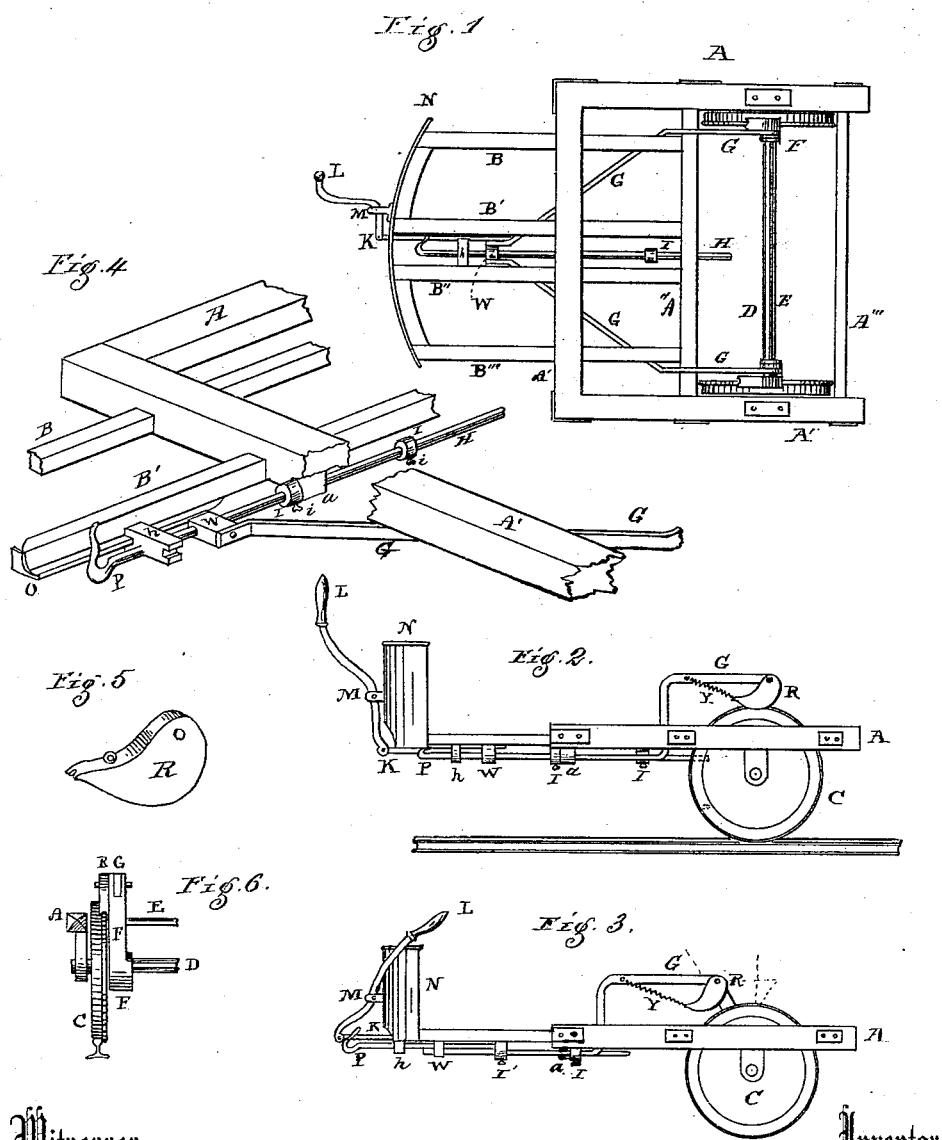
Witnesses  Inventor

UNITED STATES PATENT OFFICE.

JACOB R. JOHNS, OF MILLERSBURG, PENNSYLVANIA.

IMPROVEMENT IN CAR-STARTERS.

Specification forming part of Letters Patent No. 192,375, dated June 26, 1877; application filed April 11, 1876.

*To all whom it may concern:*

Be it known that I, JACOB R. JOHNS, of Millersburg, in the county of Dauphin and the State of Pennsylvania, have invented certain Improvements in Starting Railroad Street-Cars or Vehicles, of which the following is a specification:

This invention relates more especially to that class of inventions designed to relieve the horses used in our railroad street-cars from the heavy strain to which they are subjected at each starting.

The first part of my invention consists of an eccentric clutch or pawl that impinges directly upon the outer rim or tread of the wheel, supported on a slotted radial arm, which loosely embraces the axle on the inner side of the wheels, one on each side, and united by a cross-rod, and jointly acted upon by the draft-rod and its connection, so as to lock the wheels at starting, and turns them upon the track till the clutch is released.

The second part of my invention relates to the combination of guide-bars and cross-head in connection with the draft-pole and a hand-lever, as herein more fully set forth.

The accompanying drawing, with the letters of reference marked thereon and a brief explanation, will enable those skilled in the art to make and apply my invention, and in which—

Figure 1 is a top or plan view; Fig. 2, a side elevation with the clutch on the wheel ready to start; Fig. 3, when the clutch is thrown off, having turned the wheel forty degrees; Fig. 4, enlarged perspective view to show the draft-pole and its appliances. Fig. 5 shows the form of the eccentric clutch; Fig. 6, the combination of the clutch, lever, and the axle of the wheels.

A portion of the frame-work of an ordinary street-railroad car is shown by the letters A and B, the latter timbers supporting the platform. N represents the ordinary fender or shield of the platform. The draft-pole H extends back through a bearing, a, under the cross-beam A', and is provided at two points with adjustable stops I I, with set-screws i to adjust the range to the action of the clutch and levers. The pole H is shown formed into a hook, P, in front, when designed for a double-tree attachment, and also a hand-lever, L, held in a slotted fulcrum, M, on the outer portion of the shield N, and connected by a rod, K, with the pole H, which lever enables the driver to operate the clutch as a brake, or to aid in starting the vehicle. When a pole is used it may be directly connected to the draft-rod as a continuation of the same. A solid piece, W, surrounding the draft-rod H behind the cross-head *h*, is shown, to which is firmly secured on each side, by a bolt or otherwise, the side arms G, diverging at their union, as shown by Fig. 1, under the timbers B and A', to each side of the frame A, then nearly at right angles vertically as high as the slotted head of the radial levers F, then horizontally back, and connected on each side of the car with their respective slots in the levers by a pivot-bolt, which bolt also forms the pivot of an eccentric clutch, R, Fig. 5. These clutches, when drawn forward, act upon the upper and outer surface and flange of the wheels in a degree proportioned to the weight to be moved, and firmly locking the wheels, so that the wheel, clutch, or pawl and radial arm constitute a combined lever at starting to carry the wheel forward on the rail, when the clawed clutch is thrown off and held free by a coiled spring, Y, and the draft is transferred to the axle, which now revolves freely in the base of the radial levers F. These levers are also connected by a cross-rod, E, above the axle D, Fig. 6. To secure a direct draft, I employ between the central flooring-beams B' B'' guide-bars or ways O for a slotted cross-head, *h*, attached to the draft-pole H, and to which is also connected, by a rod, K, a hand-lever, L, as shown, so that the clutch or pawl R can be operated at pleasure by the driver as a brake or starter by hand. When the pole is used as a unit with the central draft-rod it is clear that, when the vehicle is in rapid motion and the horses brought to stand, there is sufficient momentum in the vehicle to cause it to run forward. Thus, the pole and side bars moving so easily in the guides and cross-head in a true or direct line of action, and no weight or friction to be overcome, the eccentric clutches would not only be brought into their proper position for forward action, but also act as a brake and starter automatically.

I am aware that a lever is used in connection with a movable ring, attached together by a fulcrum-bolt, so that the eccentric end of the lever impinges on the axle, as also ratchet-wheels and pawls—arrangements I do not claim or use; nor do I broadly claim a hand-lever; but I am not aware that a hand-lever is used in combination with a cross-head and draft-pole, substantially as herein set forth or shown.

What I claim is—

1. The combination of the radial arms F on the inner side of each wheel, united by a cross-rod, E, and each arm embracing the axle D of the wheels, and having their upper end slotted, supporting an eccentric clutch or pawl, R, and actuating-lever G, combined with the draft pole or rod H in such a manner as to cause said clutch R to gripe the upper surface of the car-wheel and carry it forward on starting, said clutch also held in position by a coiled spring, Y, when released, substantially as and for the purpose specified.

2. In combination with the radial arms F and clutch R, the lever-arms G, elevated above and carried down on each side, and converging to a union with the draft rod or pole H, substantially as and for the purpose set forth.

3. In combination with the central draft rod or pole H, the cross-head $h$, the guide-bars O, and appliances, all substantially arranged as shown and described, for the purpose mentioned.

J. R. JOHNS.

Witnesses:
J. F. CASLOW, M. D.,
B. Y. STEEVER.